(12) United States Patent
Zhang et al.

(10) Patent No.: US 11,538,488 B2
(45) Date of Patent: Dec. 27, 2022

(54) METHOD AND SYSTEM FOR PROCESSING SPEECH SIGNAL

(71) Applicant: ALIBABA GROUP HOLDING LIMITED, Grand Cayman (KY)

(72) Inventors: Shiliang Zhang, Hangzhou (CN); Ming Lei, Beijing (CN); Wei Li, Beijing (CN); Haitao Yao, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/698,536

(22) Filed: Nov. 27, 2019

(65) Prior Publication Data

US 2020/0176014 A1 Jun. 4, 2020

(30) Foreign Application Priority Data

Nov. 30, 2018 (CN) .......................... 201811457674.9

(51) Int. Cl.
*G10L 25/12* (2013.01)
*G10L 15/16* (2006.01)
(Continued)

(52) U.S. Cl.
CPC .............. *G10L 25/12* (2013.01); *G10L 15/16* (2013.01); *G10L 15/187* (2013.01); *G10L 25/30* (2013.01)

(58) Field of Classification Search
CPC ....... G10L 25/12; G10L 15/16; G10L 15/187; G10L 15/30
(Continued)

(56) References Cited

U.S. PATENT DOCUMENTS 5,615,299 A * 3/1997 Bahl .................... G10L 15/02
704/254
5,680,509 A * 10/1997 Gopalakrishnan ...... G10L 15/08
704/231
(Continued)

FOREIGN PATENT DOCUMENTS

CN 103813166 A 5/2014
CN 107221326 A 9/2017
(Continued)

OTHER PUBLICATIONS

Vanhoucke, Vincent et al. "Multiframe Deep Neural Networks for Acoustic Modeling", Acoustics, Speech and Signal Processing (ICASSP), 2013 IEEE International Conference, pp. 7582-7585._ (Year: 2013).*

(Continued)

*Primary Examiner* — Bharatkumar S Shah
(74) *Attorney, Agent, or Firm* — Finnegan, Henderson, Farabow, Garrett & Dunner, LLP

(57) ABSTRACT

Embodiments of the present disclosure provide methods and systems for processing a speech signal. The method can include: processing the speech signal to generate a plurality of speech frames; generating a first number of acoustic features based on the plurality of speech frames using a frame shift at a given frequency; and generating a second number of posteriori probability vectors based on the first number of acoustic features using an acoustic model, wherein each of the posteriori probability vectors comprises probabilities of the acoustic features corresponding to a plurality of modeling units, respectively.

14 Claims, 4 Drawing Sheets

(51) Int. Cl.
    *G10L 15/187*     (2013.01)
    *G10L 25/30*     (2013.01)

(58) Field of Classification Search
    USPC .......................................................... 704/219
    See application file for complete search history.

(56) References Cited

U.S. PATENT DOCUMENTS

| | | | |
|---|---|---|---|
| 6,041,299 | A | 3/2000 | Schuster et al. |
| 8,442,821 | B1 | 5/2013 | Vanhoucke |
| 2016/0217367 | A1 | 7/2016 | Moreno et al. |
| 2017/0256254 | A1 | 9/2017 | Huang et al. |
| 2018/0336886 | A1 | 11/2018 | Sun et al. |
| 2019/0051291 | A1* | 2/2019 | Yoo .......................... G06N 3/084 |

FOREIGN PATENT DOCUMENTS

| | | | | |
|---|---|---|---|---|
| EP | 0689193 | A1 | 12/1994 | |
| JP | 3299408 | B2 * | 7/2002 | ............. G10L 15/02 |

OTHER PUBLICATIONS

Jianxiong Wu and Chorkin Chan, "Isolated word recognition by neural network models with cross-correlation coefficients for speech dynamics," in IEEE Transactions on Pattern Analysis and Machine Intelligence, vol. 15, No. 11, pp. 1174-1185, Nov. 1993, doi: 10.1109/34.244678. (Year: 1993).*

Ianxiong Wu and Chorkin Chan, "Isolated word recognition by neural network models with cross-correlation coefficients for speech dynamics," in IEEE Transactions on Pattern Analysis and Machine Intelligence, vol. 15, No. 11, pp. 1174-1185, Nov. 1993, doi: 10.1109/34.244678. (Year: 1993) (Year: 1993).*

PCT International Search Report and Written Opinion dated Feb. 3, 2020, issued in corresponding International Application No. PCT/US2019/063677 (8 pgs.).

Vanhoucke, Vincent et al. "Multiframe Deep Neural Networks for Acoustic Modeling", Acoustics, Speech and Signal Processing (ICASSP), 2013 IEEE International Conference, pp. 7582-7585.

Pundak, Golan et al. "Lower Frame Rate Neural Network Acoustic Models", INTERSPEECH 2016, Sep. 8-12, 2016, San Francisco, CA, pp. 22-26.

First Chinese Search Report issued in corresponding Chinese Application No. 201811457674.9 dated Aug. 9, 2021 (1 page).

* cited by examiner

METHOD AND SYSTEM FOR PROCESSING SPEECH SIGNAL

CROSS REFERENCE TO RELATED APPLICATION

The disclosure claims the benefits of priority to Chinese application number 201811457674.9, filed Nov. 30, 2018, which is incorporated herein by reference in its entirety.

BACKGROUND

In recent years, with the application of deep learning technologies, speech recognition systems based on deep neural networks have been greatly improved in performance and are gradually becoming practical. Speech input, speech transcription, speech retrieval, speech translation and the like based on speech recognition have been widely used. An acoustic model is a core module of speech recognition systems and is also a research hotspot at present. According to statistics, the process of decoding a speech signal by an acoustic model consumes the most computing resources in the whole decoding process. Therefore, it is an important technical requirement to reduce the computational cost of the acoustic model.

SUMMARY OF THE DISCLOSURE

Embodiments of this disclosure provide a speech processing method and apparatus, which can improve the computational efficiency of an acoustic model and improve the recognition efficiency of speech recognition while ensuring the accuracy of output from the acoustic model.

Embodiments of the disclosure provide a method for processing a speech signal. The method can include: processing the speech signal to generate a plurality of speech frames; generating a first number of acoustic features based on the plurality of speech frames using a frame shift at a given frequency; and generating a second number of posteriori probability vectors based on the first number of acoustic features using an acoustic model, wherein each of the posteriori probability vectors comprises probabilities of the acoustic features corresponding to a plurality of modeling units, respectively.

Embodiments of the disclosure also provide an apparatus for processing a speech signal. The apparatus can include: a memory storing a set of instructions; and at least one processor configured to execute the set of instructions to cause the apparatus to perform: processing the speech signal to generate a plurality of speech frames; generating a first number of acoustic features based on the plurality of speech frames using a frame shift at a given frequency; and generating a second number of posteriori probability vectors based on the first number of acoustic features using an acoustic model, wherein each of the posteriori probability vectors comprises probabilities of the acoustic features corresponding to a plurality of modeling units, respectively.

Embodiments of the disclosure further provide a non-transitory computer readable medium that stores a set of instructions that is executable by at least one processor of a computer system to cause the computer system to perform a method for processing a speech signal. The method can include: processing the speech signal to generate a plurality of speech frames; generating a first number of acoustic features based on the plurality of speech frames using a frame shift at a given frequency; and generating a second number of posteriori probability vectors based on the first number of acoustic features using an acoustic model, wherein each of the posteriori probability vectors comprises probabilities of the acoustic features corresponding to a plurality of modeling units, respectively.

BRIEF DESCRIPTION OF THE DRAWINGS

In order to illustrate the technical solutions in embodiments of this disclosure or the prior art more clearly, the accompanying drawings to be used in the descriptions of the embodiments or the prior art will be briefly introduced below. It is apparent that the accompanying drawings in the following descriptions are merely some embodiments disclosed in this disclosure. Those of ordinary skill in the art can also obtain other accompanying drawings according to these accompanying drawings without creative efforts.

DETAILED DESCRIPTION

Figure 1:
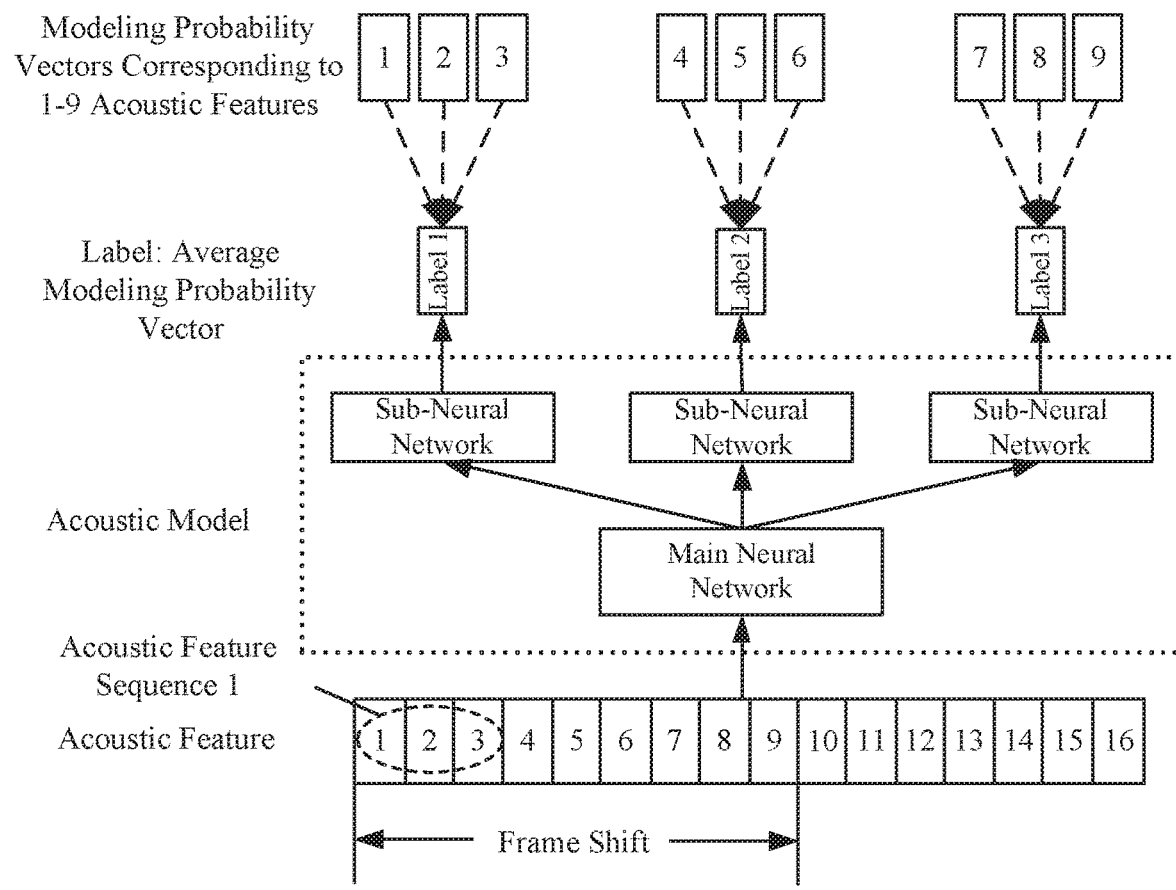
FIG. 1 is a schematic diagram of an exemplary speech processing method, according to some embodiments of the disclosure.

In order to make those skilled in the art better understand the technical solutions in this disclosure, the technical solutions of this disclosure will be clearly and completely described below with reference to the accompanying drawings in embodiments of this disclosure. It is apparent that the embodiments described are merely some of, rather than all, the embodiments of this disclosure. All other embodiments obtained by those of ordinary skill in the art based on embodiments in this disclosure without creative efforts should be encompassed in the protection scope of this disclosure.

It should be noted that the terms "first," "second," and the like in the specification, claims and drawings of the disclosure are used to distinguish similar objects, but not necessarily to describe a particular order or sequence. It should be understood that such terms used can be interchanged under appropriate circumstances, so that the embodiments of the present disclosure described here can be implemented in an order different from those illustrated or described here. In addition, the terms "comprise/include" and "have" as well as any variations thereof are intended to cover non-exclusive inclusion. For example, a process, method, system, product or device including a series of steps or units need not be limited to the steps or units clearly listed but may include other steps or units not clearly listed or inherent to the process, method, product or device.

Acoustic features extracted from each speech frame in a speech signal are the input to the acoustic model. The acoustic model can be configured to generate posteriori probability vectors based on acoustic features. The acoustic features of each speech frame theoretically correspond to a modeling unit. The modeling unit may include, for example, one of a phone state (state), a context-based state (CD-state), a phone, and a context-based phone (CD-phone). The modeling unit may be associated with initials, finals, and the like of a speech signal. Therefore, the output from the acoustic model is a posteriori probability distribution of the acoustic features of the speech frame relative to a plurality of preset modeling units. As such, the input acoustic features can be converted into a plurality of posterior probability distributions, which can then be decoded in combination with a language model to obtain a recognition result of the speech signal. For example, a typical Chinese character usually lasts for 100 ms to 200 ms, and speech frames associated with the Chinese character may include 10 frames to 20 frames. Then, if a speech signal corresponding to a Chinese character is processed in the above manner, the acoustic model is required to perform 10-20 calculations corresponding to the 10-20 frames. Therefore, the acoustic model can consume a lot of computing resources to process a speech signal.

When compared to conventional methods, the embodiments of the disclosure provide an acoustic model with a lower computational cost.

To facilitate the understanding of embodiments of this disclosure, a technical environment for implementing the technical solutions is described below.

Based on the requirement for reducing the computational cost of the acoustic model, a lower frame rate (LFR) algorithm can be used. In the LFR algorithm, acoustic features of a plurality of adjacent speech frames can be input into the acoustic model based on the strong correlation between adjacent speech frames. The acoustic model can determine an average posterior probability distribution for the plurality of acoustic features relative to a plurality of preset modeling units based on the acoustic features of the plurality of adjacent speech frames. In general, a single speech frame can last for 10 ms, and three consecutive speech frames (that is, 30 ms) can be input each time based on the LFR algorithm. As such, the calculation of the acoustic model can be reduced to one third of the original calculation amount. However, if more speech frames (e.g., four or more) is to be input each time, an output result of the acoustic model has relatively low accuracy. This is because different speech frames are not exactly the same in spite of the correlation between adjacent speech frames. Also, a larger number of input speech frames produce a greater difference accordingly. Therefore, it is difficult to train the acoustic model to allow the acoustic model to process acoustic features corresponding to more speech frames each time while ensuring relatively high accuracy of the output from the acoustic model.

Embodiments of the disclosure provide a method, so that the acoustic model can process acoustic features corresponding to more speech frames each time, while relatively high accuracy of the output from the acoustic model can be ensured.

The speech processing method provided in the embodiments of this disclosure is described below through a specific application scenario with reference to FIG. 1.

FIG. 1 is a schematic diagram of an exemplary speech processing method, according to some embodiments of the disclosure. As shown in FIG. 1, the acoustic model can be completed by training based on the LFR algorithm and multi-frame prediction (MFP) algorithm, and three consecutive acoustic features can be processed each time based on each of the LFR algorithm and the MFP algorithm. Therefore, the acoustic model can process acoustic features corresponding to nine consecutive speech frames each time. The acoustic model may be trained by a deep neural network. In some embodiments, training samples can be labeled to supervise the training process of the acoustic model. The labels may include the average modeling probability vector shown in FIG. 1. The average modeling probability vector may be obtained by calculation according to modeling probability vectors corresponding to a plurality of acoustic features. For example, in FIG. 1, the acoustic features numbered 1-9 can be classified into three acoustic feature sequences. The first acoustic feature sequence can include the acoustic features numbered 1, 2, 3. The three acoustic features numbered 1, 2, 3 correspond to the modeling units a, o, e, respectively, which correspond to the first three finals in a table of finals. Then, modeling probability vectors respectively corresponding to the acoustic features numbered 1, 2, 3 can be expressed as [1, 0, 0, 0, . . . ], [0, 1, 0, 0, . . . ] and [0, 0, 1, 0, . . . ]. An average modeling probability vector of the three modeling probability vectors corresponding to the acoustic feature sequence 1 can be labeled as "Label 1." Similarly, the acoustic features numbered 4-9 can be classified into the other two acoustic feature sequences, which can be further labeled as "Label 2" and "Label 3." After Labels 1, 2 and 3 are acquired, the acoustic model can be trained by using the 9 acoustic features as the input and the labels 1, 2 and 3 as supervision information.

Therefore, the computational efficiency of the acoustic model can be greatly improved in the practical application of the acoustic model. For a speech signal with 900 speech frames, 300 computations are required according to the conventional LFR algorithm and MFP algorithm. However, only 100 calculations are required for the method according to embodiments of this disclosure.

Figure 2:
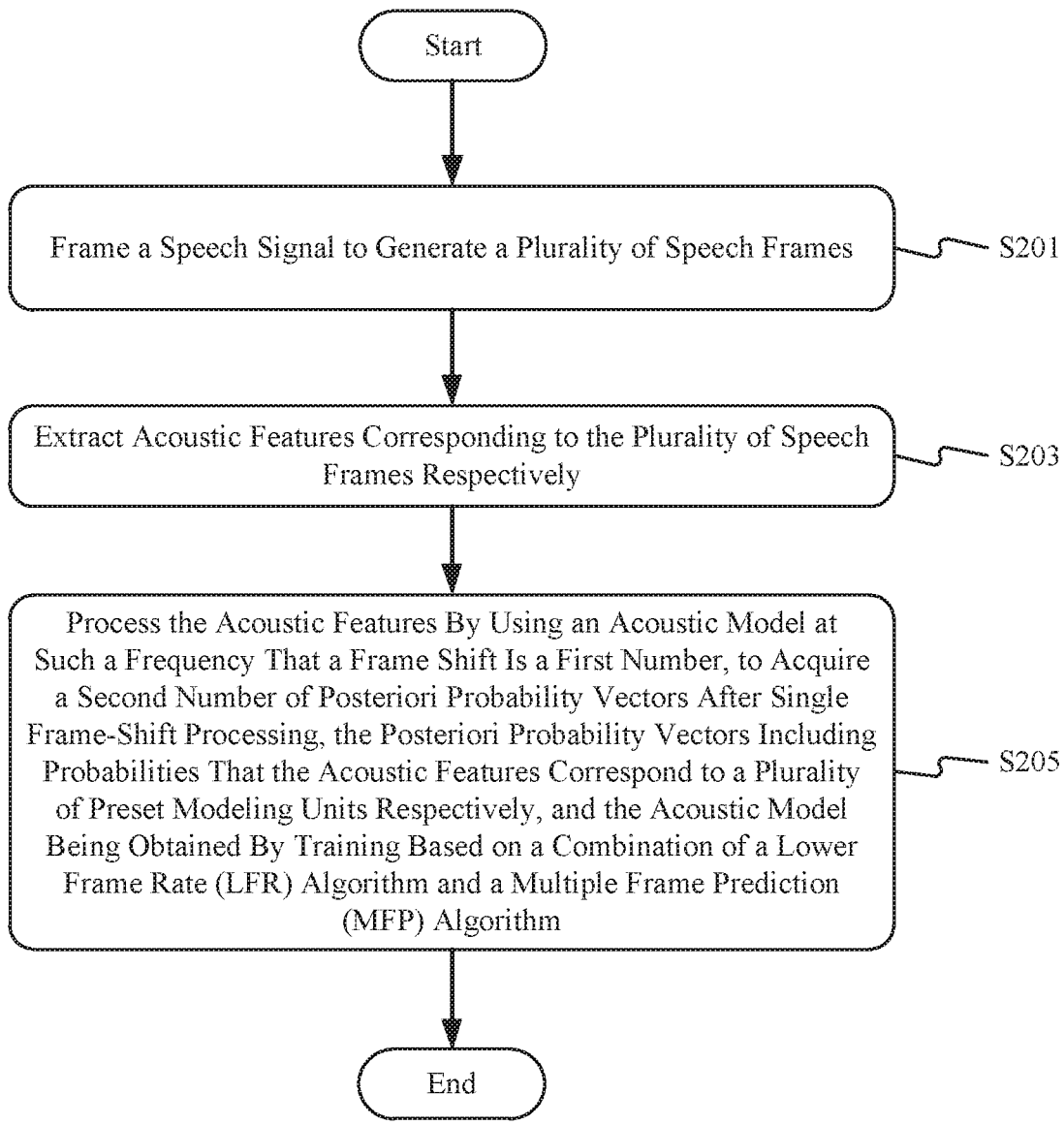
FIG. 2 is a flowchart of an exemplary speech processing method, according to some embodiments of the disclosure.

The speech processing method in this disclosure is described in detail below with reference to the accompanying drawings. FIG. 2 is a flowchart of an exemplary speech processing method, according to some embodiments of the disclosure. Although this disclosure provides operation steps of the method as described in the following embodiment or the drawings, the method may include more or fewer operation steps. Where steps have no necessary causal relationship logically, the sequence of execution of these steps is not limited to the sequence of execution provided in the embodiments of this disclosure. When the method is actually executed in a speech processing process or apparatus, the steps can be executed based on a method order shown in the embodiment or the accompany drawing or can be executed concurrently (for example, in a concurrent processor or a multi-thread processing environment).

Embodiments of the disclosure provide a speech processing method, as shown in FIG. 2. The method can be executed by a computer system. The computer system can include a memory storing a set of instructions and at least one processor configured to execute the set of instructions to cause the computer system to perform the speech processing method. The method may include steps as below.

At step S201, a speech signal can be processed to generate a plurality of speech frames. In some embodiments, a speech signal can be divided into frames before the speech signal is analyzed. In other words, the speech signal can be classified into several segments, each of which is referred to as a speech frame. The framing operation can be implemented by using a move function, and there may be an overlapping part between frames. If each speech frame has a length of 25 milliseconds and a frame shift is 10 milliseconds, there is an overlap of (25−10=15) milliseconds between every two speech frames. It is appreciated that the speech signal can also be preprocessed before the speech signal is framed. The preprocessing process may include silence removal, noise removal, and other processing steps. For example, removal of silence at the end of a speech signal can reduce the interference with subsequent steps.

At step S203, acoustic features corresponding to the plurality of speech frames can be extracted respectively.

At step S205, a first number of the acoustic features can be processed by using an acoustic model at a given frame shift to acquire a second number of posteriori probability vectors. The posteriori probability vectors can include probabilities that the acoustic features correspond to a plurality of preset modeling units respectively, and the acoustic model can be obtained by training based on a combination of an LFR algorithm and an MFP algorithm.

After the speech signal is framed at step S201, the speech signal can be transformed into a plurality of small speech frames. However, the speech signal is in the form of sound waves, and therefore the waveform can be transformed into a form that can be processed. In some embodiments, acoustic features of the speech signal can be extracted. A typical acoustic feature extraction can be based on Mel Frequency Cepstrum Coefficients (MFCCs). In the process of acoustic feature extraction, the waveform of each speech frame can be transformed into a multi-dimensional vector based on MFCCs. The multi-dimensional vector can include content information of the speech signal of the frame. It is appreciated that the acoustic feature extraction may not be limited to the MFCC and may also include many other manners. In an example, after the acoustic features of the speech signal are extracted, the speech signal can be transformed into a matrix with M rows and N columns, where M is the number of acoustic features and N is the total number of frames of the speech signal.

After features of the plurality of speech frames are extracted, the speech frames are transformed into a plurality of acoustic features. In an example, 120 speech frames can be generated after a speech is processed, and 120 acoustic features can be generated after features of the 120 speech frames are extracted. When the 120 acoustic features are processed by using the acoustic model, which is based on a low frame rate (e.g., the frame rate is 3), the 120 acoustic features can be input into the acoustic model according to a rule of inputting three acoustic features each time. In other words, (120/3)=40 calculations are required. Correspondingly, the acoustic model can generate 40 posterior probability vectors including probabilities that the acoustic features correspond to a plurality of preset modeling units, respectively. The modeling units may include one of a phone, a context-based phone (CD-phone), a phone state (state), and a context-based state (CD-state). For phones, the pronunciation of a word can include one or more phones. A set of phones commonly used in English is composed of 39 phones according to Carnegie Mellon University. Similarly, a set of phones in the Chinese language can include 23 initials and 24 finals. A phone state is a more detailed phonetic unit than a phone, and a phone usually can include three phone states. In the process of speech recognition, speech frames can be recognized into phone states, the phone states can be combined into phones, and the phones can be combined into words. In other words, if the modeling unit of each speech frame can be accurately identified, a result of speech recognition can be obtained. It is appreciated that, the modeling units may also include other units capable of expressing pronunciation states, which are not limited in this disclosure.

In the process of acquiring the modeling unit corresponding to the acoustic features of the speech frame, a posterior probability of an acoustic feature corresponding to a modeling unit can be determined. A higher posterior probability can indicate a higher probability of the speech frame corresponding to the modeling unit. To describe posterior probabilities of different acoustic features corresponding to different modeling units conveniently, posterior probability vectors can be used. Compared with prior probabilities, posterior probabilities can use more comprehensive data of a natural state, e.g., including prior probability data and supplementary data. Therefore, the posterior probabilities have higher accuracy in information expression than prior probabilities. In an example, in Chinese, 47 preset modeling units can be defined, including 23 initials and 24 finals. Thus, values of posteriori probabilities of an acoustic feature belonging to the above 47 preset modeling units can be different. Therefore, a posterior probability vector having 47 elements can be established to express the values of the posteriori probabilities of the acoustic feature belonging to the preset modeling units, respectively. In an example, a posterior probability vector of an acoustic feature can be [0.06, 0, 0, 0.1 . . . , 0.4, 0.01.0.02].

In some embodiments of the disclosure, the acoustic model can process acoustic features corresponding to more speech frames each time. In the MFP algorithm, the acoustic model can simultaneously process acoustic features corresponding to M speech frames and acquire posterior probability vectors corresponding to the M acoustic features, respectively. In other words, the acoustic model can acquire M posterior probability vectors. However, generally, a value of M has to be less than or equal to 3. In a neural-network-based acoustic model, when more acoustic features are input, differences between the acoustic features can be more significant, and thus it is more difficult to tune network parameters in the acoustic model. Therefore, it is also difficult to expand the number of acoustic features processed each time by the acoustic model based on the MFP algorithm. In some embodiments of the disclosure, the LFR algorithm and the MFP algorithm can be combined to expand the number of acoustic features input into the acoustic model.

In an example, based on the LFR algorithm, the acoustic model can transform 3 acoustic features into 1 posteriori probability vector each time. Based on the MFP algorithm, the acoustic model can simultaneously predict 3 posteriori probability vectors for 3 acoustic features each time. In some embodiments, in combination with the LFR algorithm, acoustic features in the MFP prediction algorithm can be replaced with an acoustic feature sequence. The acoustic feature sequence can include three acoustic features. As such, the acoustic model can process 3×3=9 acoustic features each time and output 3 posterior probability vectors. Therefore, the method according to embodiments of this disclosure can reduce the calculation amount of the acoustic model to one third of the original calculation amount.

Figure 3:
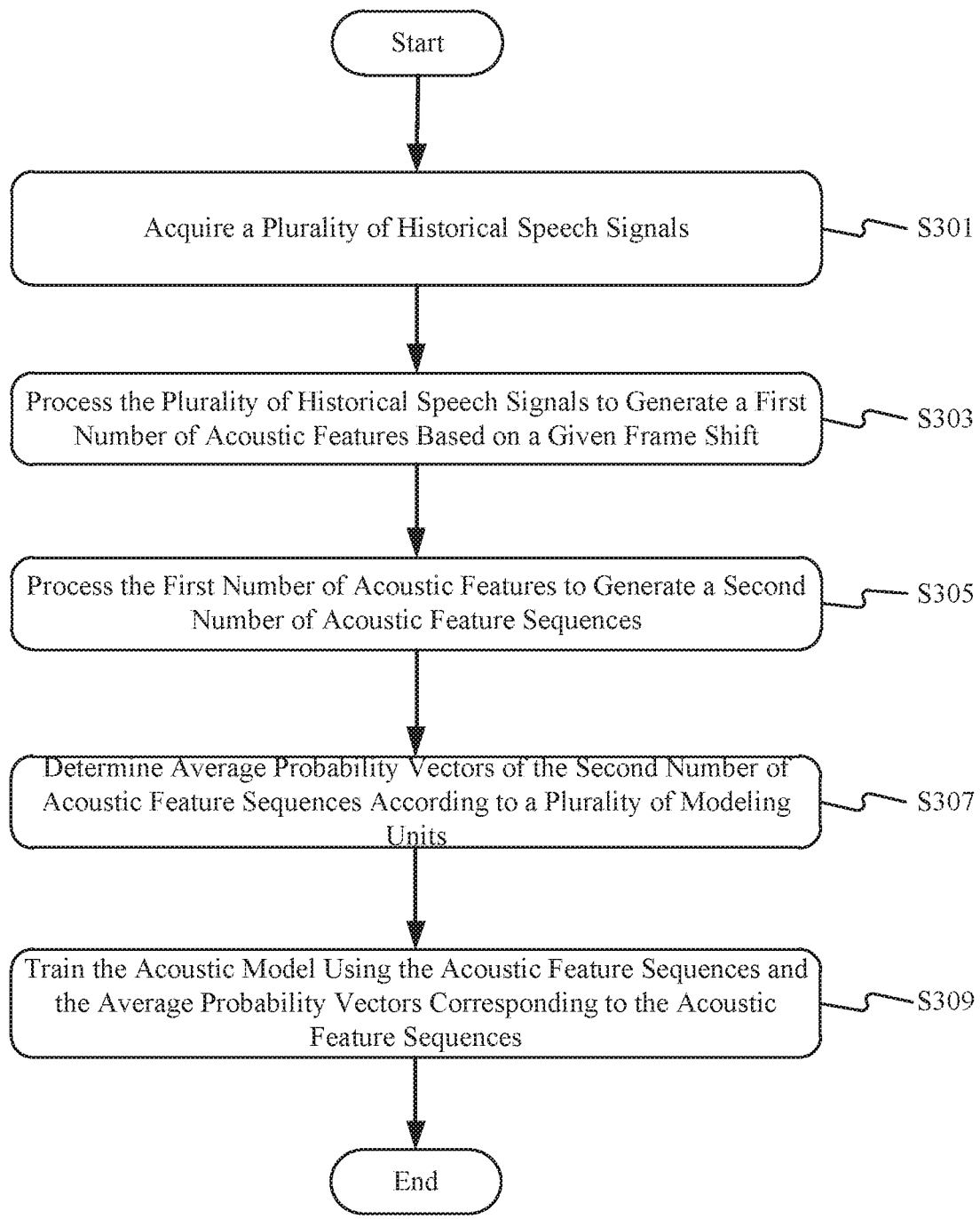
FIG. 3 is a flowchart of an exemplary method for obtaining an acoustic model, according to some embodiments of the disclosure

Embodiments of the disclosure further provide a method for training an acoustic model. FIG. 3 is a flowchart of an exemplary method 300 for obtaining an acoustic model, according to some embodiments of the disclosure. Method 300 can be executed by a computer system. The computer system can include a memory storing a set of instructions and at least one processor configured to execute the set of instructions to cause the computer system to perform method 300 for obtaining the acoustic model. Method 300 can include steps as below.

At step S301, a plurality of historical speech signals can be acquired. The historical speech signals can be retrieved and stored in advance.

At step S303, the plurality of historical speech signals can be processed to generate a first number of acoustic features based on a given frame shift.

At step S305, the first number of acoustic features can be processed to generate a second number of acoustic feature sequences. The acoustic feature sequences can include a third number of adjacent acoustic features. A plurality of modeling units can be further generated based on the third number of adjacent acoustic features.

At step S307, average probability vectors of the second number of acoustic feature sequences can be determined according to the plurality of modeling units.

At step S309, the acoustic model can be trained using the acoustic feature sequences and the average probability vectors corresponding to the acoustic feature sequences.

In some embodiments of this disclosure, a plurality of historical speech signals can be acquired as training data for the acoustic model. Then, a plurality of acoustic features corresponding to the historical speech signals and modeling units corresponding to the plurality of acoustic features can also be acquired. Then, the plurality of acoustic features corresponding to the historical speech signals can be classified at such a frequency that a frame shift is the first number, that is, the acoustic features are classified according to the first number each time. The first number is a maximum number of acoustic features that can be processed by the acoustic model. As indicated in the above example, the acoustic model can process 3×3=9 acoustic features each time, and thus, the first number is 9 (e.g., as shown in FIG. 1). Because the LFR algorithm and the MFP algorithm each have a processing capacity upper limit, the first number of acoustic features processed each time can be further classified into the second number of acoustic feature sequences. The acoustic feature sequences include a third number of adjacent acoustic features. In the above example, the 9 acoustic features can be sequentially classified into 3 acoustic feature sequences, and the acoustic feature sequences each can include 3 adjacent acoustic features.

In some embodiments of this disclosure, in the process of training the acoustic model by deep learning, labels (e.g., the labels 1, 2, 3 in FIG. 1) can be used for supervising the training. In some embodiments of the disclosure, the first number of acoustic features are used as the input to the acoustic model, and the corresponding labels may include average probability vectors of the second number of acoustic feature sequences corresponding to the plurality of preset modeling units. The average probability vectors are described below through a specific example. The 9 acoustic features that are input each time can be evenly classified into 3 acoustic feature sequences in order, and the acoustic feature sequences each can include 3 adjacent acoustic features. Then, a label corresponding to a single acoustic feature sequence is an average probability vector of the 3 adjacent acoustic features corresponding to a plurality of preset modeling units. For example, in Chinese characters, the modeling units corresponding to the 3 adjacent acoustic features can include "a," "o," and "e," respectively, which correspond to the first three finals in the Table of Finals. Then, the probability vectors corresponding to the 3 adjacent acoustic features can be expressed as [1, 0, 0, 0, . . . ], [0, 1, 0, 0, . . . ] and [0, 0, 1, 0, . . . ]. An average probability vector of the three probability vectors is used as a corresponding label of the single acoustic feature sequence. In this example, three average probability vectors can be used as the labels of the 9 acoustic features, and the acoustic model is obtained by training in a deep learning manner.

In some embodiments, in the process of training the acoustic model in a deep learning manner, an acoustic model can be constructed based on deep learning, and network parameters can be set in the acoustic model. A neural network used in the deep learning can include, but not limited to, Deep Neural Networks (DNNs), Recurrent Neural Networks (RNNs), Long Short Term Memory (LSTM), Feedforward Sequential Memory Networks (FSMNs), and so on. In the process of training, the historical speech signals can be input into the acoustic model according to a pattern of inputting the second number of acoustic feature sequences (i.e., the first number of acoustic features) each time, and the second number of prediction probability vectors can be acquired each time. Then, the network parameters can be adjusted iteratively based on differences between the average probability vectors and the prediction probability vectors, till the differences meet a preset requirement. It should be noted that the manner of training the acoustic model is not limited to the above embodiments.

In an embodiment of the disclosure, as shown in FIG. 1, the acoustic model can include a main neural network and a plurality of mutually independent sub-neural networks coupled with the main neural network. An input end of the main neural network can function as an input end of the acoustic model. And, an output end of the main neural network is coupled to input ends of the plurality of sub-neural networks, respectively. Accordingly, the plurality of sub-neural networks can output a result of the acoustic model.

The plurality of sub-neural networks is used to further perform feature transformation on the output from the main neural network, so that the acoustic model can be adapted to the prediction of a plurality of mutually independent output targets (e.g., the average probability vectors). In addition, there are similarities between the average probability vectors of the plurality of acoustic feature sequences, but there are also some differences. Therefore, the plurality of sub-neural networks can deal with the differences, reduce the influences of the differences on the acoustic model, and enhance the modeling capability of the acoustic model. Because the complex main neural network can obtain highly discriminative features in the acoustic features, the sub-neural networks can adopt some simple structures, such as a DNN with 1-2 layers. As such, on the one hand, the modeling capability of the acoustic model can be enhanced, and on the other hand, it is unnecessary to increase the calculation amount a lot.

In some embodiments of the disclosure, the plurality of sub-neural networks each can have a structure of multiple layers. Therefore, an output end of a last layer of the multiple layers in a sub-neural network can be an output end of the acoustic model. Because the plurality of sub-neural networks may have the structure of multiple layers, the acoustic model can be further adapted to the prediction of a plurality of mutually independent output targets (e.g., the average probability vectors). Moreover, the plurality of sub-neural networks can further reduce the influences of the differences between the average probability vectors of the plurality of acoustic feature sequences on the acoustic model and enhance the modeling capability of the acoustic model. On this basis, the number of acoustic features processed by the acoustic model each time can be further extended, for example, the first number is set to 12, 16, 18, 20, and the like.

According to the speech processing method provided in embodiments of this disclosure, an acoustic model in speech recognition can be obtained by training based on a combination of an LFR algorithm and an MFP algorithm. A plurality of adjacent acoustic features can be processed by each of the LFR algorithm and the MFP algorithm each time, but in both algorithms, it is difficult to extend the number of acoustic features processed each time due to differences between the plurality of adjacent acoustic features. On this basis, the LFR algorithm and the MFP algorithm can be combined to realize a multiplicative extension of the single processing capacity. Therefore, the speech processing method provided in some embodiments of this disclosure can greatly improve the computational efficiency of an acoustic model and improve the recognition efficiency of speech recognition while ensuring the accuracy, of output from the acoustic model.

Figure 4:
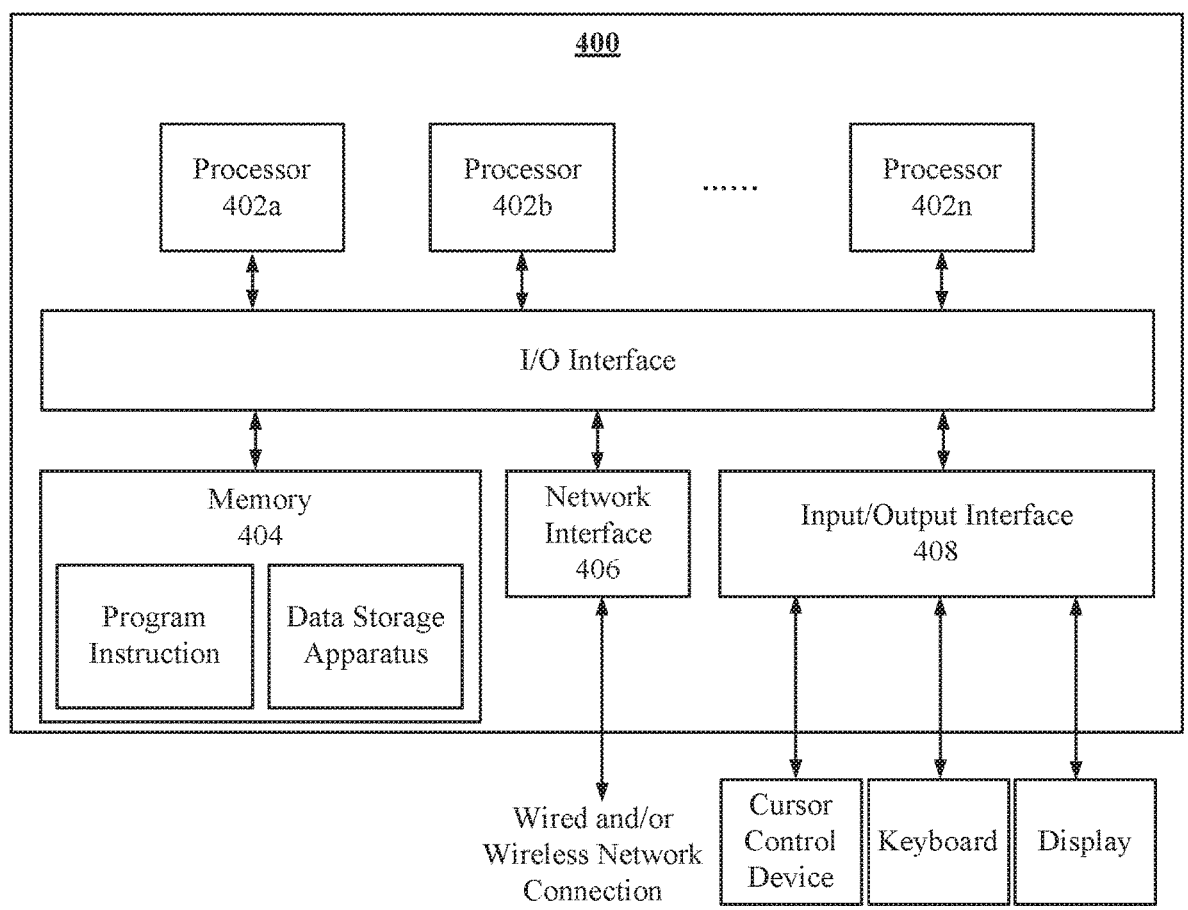
FIG. 4 is a block diagram of an exemplary speech processing apparatus, according to some embodiments of the disclosure.

Embodiments of the disclosure further provide a speech processing apparatus. The apparatus can include a memory storing a set of instructions and at least one processor configured to execute the set of instructions to cause the apparatus to perform the above method. For example, the apparatus can be one of a mobile terminal, a computer, or a similar computational unit. FIG. 4 illustrates a block diagram of a speech processing apparatus 400, according to some embodiments of the disclosure. As shown in FIG. 4, apparatus 400 can include at least one processor 402. For example, at least one processor 402 can include a processor 402a, a processor 402b, . . . , and a processor 402n. At least one processor 402 can include, but is not limited to, an NPU accelerator, a microprocessor MCU, a programmable logic device FPGA, or other processing apparatuses. Apparatus 400 can also include a memory 404 configured to store data (e.g., a set of instructions, intermediate data, and the like). In addition to at least one processor 402 and memory 404, apparatus 400 can further include a network interface 406 providing wired or wireless network connection and an input/output (I/O) interface 408 coupled with peripheral devices (e.g., a cursor control device, a keyboard, a display, a camera, and the like). I/O interface 408 can include at least one of a Universal Serial Bus (USB) port, a peripheral component interconnect express (PCI-E) port, and the like.

It is appreciated that at least one processor 402 and/or other data processing circuits can be collectively referred to as a "data processing circuit" in this context. The data processing circuit may be embodied entirely or partially as software, hardware, firmware or any other combination. In addition, the data processing circuit may be a single independent processing module or may be combined entirely or partially into any one of other components of speech processing apparatus 400.

Memory 404 can be configured to store a software program and a module of an application (e.g., program instructions corresponding to the above speech processing method). Memory 404 can include a high-speed random-access memory or a non-volatile memory. In some embodiments, memory 404 can further include memories remotely disposed with respect to at least one processor 402. The remote memories can be connected to at least one processor 402 through a network. Examples of the network include, but are not limited to, the Internet, an intranet, a local area network, a mobile communications network, and a combination thereof.

Network interface 406 is configured to receive or send data through a network. Examples of the network can include a wireless network provided. For example, network interface 406 can include a Network Interface Controller (NIC), which can be connected to other network devices through a base station and is thus capable of communicating with the Internet. As another example, network interface 406 can be a Radio Frequency (RF) module, which is configured to communicate with the Internet in a wireless manner.

The display can be, for example, a touch-screen liquid crystal display (LCD). The LCD enables a user to interact with a user interface of speech processing apparatus 400.

The above speech processing method according to embodiments of this disclosure can be applied to electronic devices having a speech processing function. The electronic devices can be classified into the following categories according to different data processing capabilities.

TABLE 1

| Category number | Category name | Exemplary device | Data processing capability |
|---|---|---|---|
| 1 | Primary network device | Internet of things devices, edge node devices | Data collection and transmission |
| 2 | Simple network device | Smart wearable devices, POS (point of sale) machines | Data collection, transmission, and simple data preprocessing |
| 3 | Intermediate network device | Smart home appliances, smart speakers | Data collection, transmission, and data preprocessing with medium power consumption |
| 4 | Intelligent network device | Smart phones and tablet computers with good performance | Data collection, transmission, data preprocessing with high power consumption, and data query matching |
| 5 | High-performance device | Workstations, smart phone booths | Data collection, transmission, data preprocessing, data query matching, and data storage |

The hardware of the primary network device is relatively simple and can make a record through a microphone to generate audio information. The generated audio information can be sent to a server through a network communication module. The primary network device may include a microphone, a network communication unit, a sensor, and a loudspeaker. The primary network device may not be capable of data processing. The primary network device may also be provided with other sensors for collecting operating parameters of the primary network device. For example, the primary network device may be an Internet of things device, an edge node device, and the like.

The simple network device may mainly include: a microphone, a network communication unit, a processor, a memory, a loudspeaker, and so on. The simple network device enhances the data processing capability compared with the primary network device. The simple network device can have a processor capable of processing simple logical operations. Therefore, after collecting data, the simple network device can conduct preliminary preprocessing of the data, such as generating a feature matrix based on audio information. The simple network device can have a display module with a simple display function, which can be used to feed information back to the user. For example, the simple network device can be a smart wearable device, a POS machine, and the like. More particularly, the simple network device can be a smart bracelet, a low-level smart watch, smart glasses, or a settlement device (e.g., a POS machine) in an offline shopping site, a mobile settlement device (e.g., a hand-held POS machine, a settlement module attached to a handheld device), and the like.

The intermediate network device may include a microphone, a network communication unit, a processor, a memory, a display, a loudspeaker, and the like. In the intermediate network device, a clock speed of the processor can be less than 2.0 GHz, the memory capacity can be less than 2 gigabytes (GB), and the storage capacity can be less than 128 GB. The intermediate network device can process recorded audio information to a certain extent, such as generating a feature matrix, and performing endpoint detection processing, noise reduction processing, speech recognition, and the like on the feature matrix. For example, the intermediate network device can include: a smart home appliance in a smart home, a smart home terminal, a smart speaker, an advanced smart watch, a low-level smart phone, a vehicle-mounted intelligent terminal, and the like.

The intelligent network device may include a microphone, a network communication unit, a processor, a memory, a display, a loudspeaker, and the like. The intelligent network device can have a strong data processing capability. In the intelligent network device, a clock speed of the processor can be less than 2.0 GHz, the memory capacity can be less than 12 GB, and the storage capacity can be less than 1 terabyte (TB). After a feature matrix is generated for audio information, endpoint detection processing, noise reduction processing, speech recognition, and the like can be carried out. Further, the intelligent network device can also generate speech feature vectors based on the audio information. In some cases, the speech feature vectors can be matched with user feature vectors to identify the user. However, the matching is limited to a limited number of user feature vectors, such as user feature vectors of family members in a family. For example, the intelligent network device can include smart phones, tablet computers, desktop computers, laptop computers, and the like with good performance.

The high-performance device may include a microphone, a network communication unit, a processor, a memory, a display, a loudspeaker, and the like. The high-performance device can have a capability of processing large-scale data and can also provide a powerful data storage capability. In the high-performance device, a clock speed of the processor can be more than 3.0 GHz, the memory capacity can be greater than 12 GB, and the storage capacity can be more than 1 TB. The high-performance device can generate a feature matrix for audio information, perform endpoint detection processing, perform noise reduction processing, perform speech recognition, generate speech feature vectors, and match the speech feature vectors with a large number of stored user feature vectors. For example, the high-performance device can be a workstation, a desktop computer with high configuration, a Kiosk smart phone booth, a self-service machine, and the like.

Certainly, only some clients are listed above by way of examples. With the progress of science and technology, the performance of hardware devices may be improved, so that the above electronic device with a weak data processing capability currently may later have a strong processing capability. Therefore, the implementation modes hereinafter refer to the content in Table 1 above for reference only and do not constitute a limitation.

It is appreciated that the above types of hardware shown in Table 1 can implement the above data update optimizing method.

In addition to implementing the above method by using computer readable program codes, the above method can also be implemented in a form of a logic gate, a switch, an ASIC, a programmable logic controller, and an embedded microcontroller. Therefore, such a controller may be considered as a hardware component, and apparatuses included in the controller and configured to implement various functions may also be considered as structures inside the hardware component. Or, the apparatuses configured to implement various functions may even be considered as both software modules configured to implement the method and structures inside the hardware component.

This disclosure can be described in a general context of a computer executable instruction executed by a computer, for example, a program module. Generally, the program module includes a routine, a program, an object, an assembly, a data structure, a class and the like used for executing a specific task or implementing a specific abstract data type. Embodiments of the disclosure can also be implemented in distributed computing environments. In the distributed computing environments, a task is executed by using remote processing devices connected through a communications network. In the distributed computing environments, the program module may be located in local and remote computer storage media including a storage device.

Based on the above descriptions of the implementation modes, it is appreciated that the embodiments of this disclosure may be implemented by software as a software product with a universal hardware platform. The computer software product may be stored in a storage medium, such as a ROM/RAM, a magnetic disk, or an optical disc, and include several instructions that enable a computer device (which may be a personal computer, a mobile terminal, a server, a network device, or the like) to execute the method in the embodiments or certain portions of embodiments of this disclosure.

Embodiments in the disclosure are described progressively, identical or similar parts of the embodiments may be obtained with reference to each other, and each embodiment emphasizes a part different from other embodiments. This disclosure is applicable to various universal or dedicated computer system environments or configurations, for example, a personal computer, a server computer, a handheld device or a portable device, a tablet device, a multi-processor system, a microprocessor-based system, a set top box, a programmable electronic device, a network PC, a minicomputer, a mainframe computer, and a distributed computing environment including any of the above systems or devices.

The embodiments may further be described using the following clauses:

1. A method for processing a speech signal, comprising:
processing the speech signal to generate a plurality of speech frames;
generating a first number of acoustic features based on the plurality of speech frames using a frame shift at a given frequency; and
generating a second number of posteriori probability vectors based on the first number of acoustic features using an acoustic model, wherein each of the posteriori probability vectors comprises probabilities of the acoustic features corresponding to a plurality of modeling units, respectively.

2. The method according to clause 1, wherein generating the second number of posteriori probability vectors based on the first number of acoustic features further comprises:
classifying, by the acoustic model, the first number of acoustic features into the second number of acoustic feature sequences, each having a plurality of adjacent acoustic features; and
generating, by the acoustic model, the second number of posteriori probability vectors based on the second number of acoustic feature sequences, respectively.

3. The method according to clause 2, wherein the acoustic model is trained by:
acquiring a plurality of stored speech signals;
generating a plurality of acoustic features and modeling units corresponding to the plurality of acoustic features based on the plurality of stored speech signals;
generating, based on the plurality of acoustic features, a plurality of acoustic feature sequences, each having adjacent acoustic features;
determining average probability vectors of the plurality of acoustic feature sequences corresponding to the plurality of modeling units, respectively; and
generating the acoustic model using the acoustic feature sequences and the average probability vectors corresponding to the acoustic feature sequences.

4. The method according to clause 3, wherein the acoustic model is a deep neural network, wherein generating the acoustic model by training using the acoustic feature sequences and the average probability vectors corresponding to the acoustic feature sequences further comprises:
inputting the second number of acoustic feature sequences;
acquiring the second number of prediction probability vectors; and
tuning network parameters of the acoustic model based on a difference between the average probability vectors and the prediction probability vectors.

5. The method according to any one of clauses 2-4, wherein the acoustic model comprises a main neural network and the second number of sub-neural networks coupled with the main neural network.

6. The method according to clause 5, wherein an input end of the main neural network functions as an input end of the acoustic model, an output end of the main neural network is coupled to input ends of the second number of sub-neural networks, respectively, and output ends of the second number of sub-neural networks functions as an output end of the acoustic model.

7. The method according to clause 5 or 6, wherein each of the sub-neural networks comprises a plurality of layers.

8. The method according to any one of clauses 3-7, wherein the acoustic model is trained based on at least one of a lower frame rate (LFR) algorithm and a multiple frame prediction (MFP) algorithm.

9. An apparatus for processing a speech signal, comprising:
a memory storing a set of instructions; and
at least one processor configured to execute the set of instructions to cause the apparatus to perform:
processing the speech signal to generate a plurality of speech frames;
generating a first number of acoustic features based on the plurality of speech frames using a frame shift at a given frequency; and
generating a second number of posteriori probability vectors based on the first number of acoustic features using an acoustic model, wherein each of the posteriori probability vectors comprises probabilities of the acoustic features corresponding to a plurality of modeling units, respectively.

10. The apparatus according to clause 9, wherein generating the second number of posteriori probability vectors based on the first number of acoustic features further comprises:

classifying, by the acoustic model, the first number of acoustic features into the second number of acoustic feature sequences, each having a plurality of adjacent acoustic features; and
generating, by the acoustic model, the second number of posteriori probability vectors based on the second number of acoustic feature sequences, respectively.

11. The apparatus according to clause 10, wherein the acoustic model is trained by:
acquiring a plurality of stored speech signals;
generating a plurality of acoustic features and modeling units corresponding to the plurality of acoustic features based on the plurality of stored speech signals;
generating, based on the plurality of acoustic features, a plurality of acoustic feature sequences, each having adjacent acoustic features;
determining average probability vectors of the plurality of acoustic feature sequences corresponding to the plurality of modeling units, respectively; and
generating the acoustic model using the acoustic feature sequences and the average probability vectors corresponding to the acoustic feature sequences.

12. The apparatus according to clause 11, wherein the acoustic model is a deep neural network, wherein generating the acoustic model using the acoustic feature sequences and the average probability vectors corresponding to the acoustic feature sequences further comprises:
inputting the second number of acoustic feature sequences;
acquiring the second number of prediction probability vectors; and
tuning network parameters of the acoustic model based on a difference between the average probability vectors and the prediction probability vectors.

13. The apparatus according to any one of clauses 10-12, wherein the acoustic model comprises a main neural network and the second number of sub-neural networks coupled with the main neural network.

14. The apparatus according to clause 13, wherein an input end of the main neural network functions as an input end of the acoustic model, an output end of the main neural network is coupled to input ends of the second number of sub-neural networks, respectively, and output ends of the second number of sub-neural networks functions as an output end of the acoustic model.

15. The apparatus according to clause 13 or 14, wherein each of the sub-neural networks comprises a plurality of layers.

16. The apparatus according to any one of clauses 11-15, wherein the acoustic model is trained based on at least one of a lower frame rate (LFR) algorithm and a multiple frame prediction (MFP) algorithm.

17. A non-transitory computer readable medium that stores a set of instructions that is executable by at least one processor of a computer system to cause the computer system to perform a method for processing a speech signal, the method comprising:
processing the speech signal to generate a plurality of speech frames;
generating a first number of acoustic features based on the plurality of speech frames using a frame shift at a given frequency; and
generating a second number of posteriori probability vectors based on the first number of acoustic features using an acoustic model, wherein each of the posteriori probability vectors comprises probabilities of the acoustic features corresponding to a plurality of modeling units, respectively.

18. The non-transitory computer readable medium according to clause 17, wherein generating the second number of posteriori probability vectors based on the first number of acoustic features further comprises:

classifying, by the acoustic model, the first number of acoustic features into the second number of acoustic feature sequences, each having a plurality of adjacent acoustic features; and generating, by the acoustic model, the second number of posteriori probability vectors based on the second number of acoustic feature sequences, respectively.

19. The non-transitory computer readable medium according to clause 18, wherein the acoustic model is trained by:

acquiring a plurality of stored speech signals;

generating a plurality of acoustic features and modeling units corresponding to the plurality of acoustic features based on the plurality of stored speech signals;

generating, based on the plurality of acoustic features, a plurality of acoustic feature sequences, each having adjacent acoustic features;

determining average probability vectors of the plurality of acoustic feature sequences corresponding to the plurality of modeling units, respectively; and generating the acoustic model using the acoustic feature sequences and the average probability vectors corresponding to the acoustic feature sequences.

20. The non-transitory computer readable medium according to clause 19, wherein the acoustic model is a deep neural network, wherein generating the acoustic model by training using the acoustic feature sequences and the average probability vectors corresponding to the acoustic feature sequences further comprises:

inputting the second number of acoustic feature sequences;

acquiring the second number of prediction probability vectors; and tuning network parameters of the acoustic model based on a difference between the average probability vectors and the prediction probability vectors.

Although this disclosure is described through embodiments, those of ordinary skill in the art should know that this disclosure has many variations and changes without departing from the spirit of this disclosure. It is expected that the appended claims cover the variations and changes without departing from the spirit of this disclosure.

What is claimed is:

1. A method for processing a speech signal, comprising:
processing the speech signal to generate a plurality of speech frames;
generating a first number of acoustic features based on the plurality of speech frames using a frame shift at a given frequency; and
generating a second number of posteriori probability vectors based on the first number of acoustic features, each of the posteriori probability vectors comprising probabilities of the acoustic features corresponding to a plurality of modeling units, respectively, wherein:
generation uses an acoustic model trained by:
acquiring a plurality of stored speech signals;
generating a plurality of acoustic features and modeling units corresponding to the plurality of acoustic features based on the plurality of stored speech signals;
generating, based on the plurality of acoustic features, a plurality of acoustic feature sequences, each having adjacent acoustic features;
determining average probability vectors of the plurality of acoustic feature sequences corresponding to the plurality of modeling units, respectively; and
generating the acoustic model using the acoustic feature sequences and the average probability vectors corresponding to the acoustic feature sequences; and
generation further comprises:
classifying, by the acoustic model, the first number of acoustic features into the second number of acoustic feature sequences, each having a plurality of adjacent acoustic features; and
generating, by the acoustic model, the second number of posteriori probability vectors based on the second number of acoustic feature sequences, respectively.

2. The method according to claim 1, wherein the acoustic model is a deep neural network, wherein generating the acoustic model by training using the acoustic feature sequences and the average probability vectors corresponding to the acoustic feature sequences further comprises:

inputting the second number of acoustic feature sequences;

acquiring the second number of prediction probability vectors; and tuning network parameters of the acoustic model based on a difference between the average probability vectors and the prediction probability vectors.

3. The method according to claim 1, wherein the acoustic model comprises a main neural network and the second number of sub-neural networks coupled with the main neural network.

4. The method according to claim 3, wherein an input end of the main neural network functions as an input end of the acoustic model, an output end of the main neural network is coupled to input ends of the second number of sub-neural networks, respectively, and output ends of the second number of sub-neural networks functions as an output end of the acoustic model.

5. The method according to claim 3, wherein each of the sub-neural networks comprises a plurality of layers.

6. The method according to claim 1, wherein the acoustic model is trained based on at least one of a lower frame rate (LFR) algorithm and a multiple frame prediction (MFP) algorithm.

7. An apparatus for processing a speech signal, comprising:

a memory storing a set of instructions; and at least one processor configured to execute the set of instructions to cause the apparatus to perform:

processing the speech signal to generate a plurality of speech frames;

generating a first number of acoustic features based on the plurality of speech frames using a frame shift at a given frequency; and generating a second number of posteriori probability vectors based on the first number of acoustic features, each of the posteriori probability vectors comprising probabilities of the acoustic features corresponding to a plurality of modeling units, respectively, wherein:

generation uses an acoustic model trained by:
  acquiring a plurality of stored speech signals;
  generating a plurality of acoustic features and modeling units corresponding to the plurality of acoustic features based on the plurality of stored speech signals;
  generating, based on the plurality of acoustic features, a plurality of acoustic feature sequences, each having adjacent acoustic features;
  determining average probability vectors of the plurality of acoustic feature sequences corresponding to the plurality of modeling units, respectively; and
  generating the acoustic model using the acoustic feature sequences and the average probability vectors corresponding to the acoustic feature sequences; and
generation further comprises:
  classifying, by the acoustic model, the first number of acoustic features into the second number of acoustic feature sequences, each having a plurality of adjacent acoustic features; and
  generating, by the acoustic model, the second number of posteriori probability vectors based on the second number of acoustic feature sequences, respectively.

8. The apparatus according to claim 7, wherein the acoustic model is a deep neural network, wherein generating the acoustic model using the acoustic feature sequences and the average probability vectors corresponding to the acoustic feature sequences further comprises:
  inputting the second number of acoustic feature sequences;
  acquiring the second number of prediction probability vectors; and
  tuning network parameters of the acoustic model based on a difference between the average probability vectors and the prediction probability vectors.

9. The apparatus according to claim 7, wherein the acoustic model comprises a main neural network and the second number of sub-neural networks coupled with the main neural network.

10. The apparatus according to claim 9, wherein an input end of the main neural network functions as an input end of the acoustic model, an output end of the main neural network is coupled to input ends of the second number of sub-neural networks, respectively, and output ends of the second number of sub-neural networks functions as an output end of the acoustic model.

11. The apparatus according to claim 9, wherein each of the sub-neural networks comprises a plurality of layers.

12. The apparatus according to claim 7, wherein the acoustic model is trained based on at least one of a lower frame rate (LFR) algorithm and a multiple frame prediction (MFP) algorithm.

13. A non-transitory computer readable medium that stores a set of instructions that is executable by at least one processor of a computer system to cause the computer system to perform a method for processing a speech signal, the method comprising:
  processing the speech signal to generate a plurality of speech frames;
  generating a first number of acoustic features based on the plurality of speech frames using a frame shift at a given frequency; and
  generating a second number of posteriori probability vectors based on the first number of acoustic features, each of the posteriori probability vectors comprising probabilities of the acoustic features corresponding to a plurality of modeling units, respectively, wherein:
  generation uses an acoustic model trained by:
    acquiring a plurality of stored speech signals;
    generating a plurality of acoustic features and modeling units corresponding to the plurality of acoustic features based on the plurality of stored speech signals;
    generating, based on the plurality of acoustic features, a plurality of acoustic feature sequences, each having adjacent acoustic features;
    determining average probability vectors of the plurality of acoustic feature sequences corresponding to the plurality of modeling units, respectively; and
    generating the acoustic model using the acoustic feature sequences and the average probability vectors corresponding to the acoustic feature sequences; and
  generation further comprises:
    classifying, by the acoustic model, the first number of acoustic features into the second number of acoustic feature sequences, each having a plurality of adjacent acoustic features; and
    generating, by the acoustic model, the second number of posteriori probability vectors based on the second number of acoustic feature sequences, respectively.

14. The non-transitory computer readable medium according to claim 13, wherein the acoustic model is a deep neural network, wherein generating the acoustic model by training using the acoustic feature sequences and the average probability vectors corresponding to the acoustic feature sequences further comprises:
  inputting the second number of acoustic feature sequences;
  acquiring the second number of prediction probability vectors; and
  tuning network parameters of the acoustic model based on a difference between the average probability vectors and the prediction probability vectors.

* * * * *